(12) United States Patent
Lin

(10) Patent No.: US 12,174,411 B2
(45) Date of Patent: Dec. 24, 2024

(54) DISPLAY PANEL AND DISPLAY DEVICE

(71) Applicant: GUANGZHOU CHINA STAR OPTOELECTRONICS SEMICONDUCTOR DISPLAY TECHNOLOGY CO., LTD., Guangdong (CN)

(72) Inventor: Jiaxiang Lin, Guangdong (CN)

(73) Assignee: GUANGZHOU CHINA STAR OPTOELECTRONICS SEMICONDUCTOR DISPLAY TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 17/758,217

(22) PCT Filed: Jun. 9, 2022

(86) PCT No.: PCT/CN2022/097813
§ 371 (c)(1),
(2) Date: Nov. 16, 2023

(87) PCT Pub. No.: WO2023/216352
PCT Pub. Date: Nov. 16, 2023

(65) Prior Publication Data
US 2024/0219625 A1   Jul. 4, 2024

(30) Foreign Application Priority Data
May 9, 2022   (CN) .......................... 202210496834.0

(51) Int. Cl.
*F21V 8/00*   (2006.01)
(52) U.S. Cl.
CPC ........... *G02B 6/009* (2013.01); *G02B 6/0025* (2013.01); *G02B 6/0073* (2013.01)

(58) Field of Classification Search
CPC ..... G02B 6/009; G02B 6/0025; G02B 6/0073
See application file for complete search history.

(56) References Cited

U.S. PATENT DOCUMENTS

| 2003/0174492 | A1* | 9/2003 | Ohkawa | ............... | G02B 6/0068 |
| | | | | | 362/339 |
| 2014/0092630 | A1* | 4/2014 | Franklin | ............... | G02B 6/009 |
| | | | | | 362/609 |

FOREIGN PATENT DOCUMENTS

| CN | 108279527 A | 7/2018 |
| CN | 207584687 U | 7/2018 |

(Continued)

OTHER PUBLICATIONS

Hong, CN 108279527, Jul. 2018 (Year: 2018).*

(Continued)

*Primary Examiner* — Mary Ellen Bowman
(74) *Attorney, Agent, or Firm* — PV IP PC; Wei Te Chung

(57) ABSTRACT

The present application provides a display panel and a display device. The display panel includes a frame. The frame includes a light-facing portion and a backlight portion, wherein the backlight portion faces a light-shielding region and is provided as a light to guide the lights emitted from the side light source toward the frame to the light-shielding region. The backlight portion of the frame is provided as a light guide to guide the lights to the light-shielding region to improve the brightness of the light-shielding region on the display screen, so that the overall brightness of the display screen is more uniform and the display effect is improved.

20 Claims, 3 Drawing Sheets

(56) References Cited

FOREIGN PATENT DOCUMENTS

| CN | 108427228 A | 8/2018 |
|---|---|---|
| CN | 108803144 A | 11/2018 |
| CN | 108873471 A | 11/2018 |
| CN | 108983495 A | 12/2018 |
| CN | 111443525 A | 7/2020 |
| CN | 113126359 A | 7/2021 |
| JP | 2005043717 A | 2/2005 |

OTHER PUBLICATIONS

International Search Report in International application No. PCT/CN2022/097813, mailed on Dec. 16, 2022.
Written Opinion of the International Search Authority in International application No. PCT/CN2022/097813, mailed on Dec. 16, 2022.
Chinese Office Action issued in corresponding Chinese Patent Application No. 202210496834.0 dated Apr. 20, 2023, pp. 1-7.

* cited by examiner

DISPLAY PANEL AND DISPLAY DEVICE

TECHNICAL FIELD

The present application relates to a technical field of display technology, and particularly relates to a display panel and a display device.

BACKGROUND

With development of science and technology, demand for a screen of a display device becomes more and more diversified. A current display device pursues a higher screen ratio, as such space for function modules which also need to be provided on a front side of the display device is limited. In order to solve this problem, current display devices, such as full-screen display devices, hide a camera module or other functional module under the screen to meet the higher screen ratio. In this case, openings or holes are provided in the screen to place the electronic components.

Technical Problem

Since the electronic component blocks the light emitted by the side-entry light source, a dark area appears on a side that the openings or holes are far away from the side-entry light source, resulting in uneven brightness of the display device and affecting the display effect of the display device.

SUMMARY

Embodiments of the present application provide a touch display panel and a touch display device to reduce dark fringes in the touch display panel after a reliability test.

According to a first aspect, an embodiment of the present application provides a display panel, including:
- a display screen, wherein the display screen has two main surfaces opposite to each other and a side surface connected between the two main surfaces, the display screen is provided with a receiving hole, and the receiving hole is perpendicular to the main surface axially;
- a side light source mounted on a side surface of the display screen; and
- a frame disposed around the receiving hole;
- wherein the display screen has a light-shielding region in which the side light source is shielded by the frame, the frame includes a light-facing portion facing the side light source and a backlight portion facing the light-shielding region and away from the side light source, the backlight portion is provided as a light guide to guide the lights emitted from the side light source toward the frame to the light-shielding region.

According to a second aspect, an embodiment of the present application further provides a display device including a control panel, a camera unit, and a display panel. The camera is mounted in a receiving hole of the display panel, and the control panel is electrically connected to the display panel and the camera unit.

The display panel includes:
- a display screen, wherein the display screen has two main surfaces opposite to each other and a side surface connected between the two main surfaces, the display screen is provided with a receiving hole, and the receiving hole is perpendicular to the main surface axially;
- a side light source mounted on a side surface of the display screen; and
- a frame disposed around the receiving hole;
- wherein the display screen has a light-shielding region in which the side light source is shielded by the frame, the frame includes a light-facing portion facing the side light source and a backlight portion facing the light-shielding region, and the backlight portion is provided as a light guide to guide the lights emitted from the side light source toward the frame to the light-shielding region.

Beneficial Effects

According to the display panel of the present application, a side light source is used, and an frame is provided in a receiving hole of a display screen, so that a backlight portion of the frame uses a light guide to guide the lights around the backlight portion to the light-shielding region. In this way, the light guide can guide the lights around the backlight portion to the light-shielding region while reducing the thickness of the display panel. As such, the brightness of the light-shielding region of the display screen can be improved, and the overall brightness of the display screen can be more uniform. In addition, the frame is fully utilized to improve the display effect, and no additional structure is required, which is simple in structure and low in manufacturing cost.

DETAILED DESCRIPTION OF THE EMBODIMENTS

The technical solutions in the embodiments of this application will be clearly and completely described below in conjunction with the accompanying drawings in the embodiments of this application. It will be apparent that the described embodiments are only some but not all of the embodiments of the present application. Based on the embodiments of the present application, all other embodiments obtained by a person skilled in the art without creative efforts are within the scope of the present application.

Embodiments of the present application provide a display panel 100 and an electronic device to improve a technical problem of brightness unevenness caused by placing an electronic component in a display screen 10 through an opening. The following description will be made with reference to the accompanying drawings.

Figure 1:
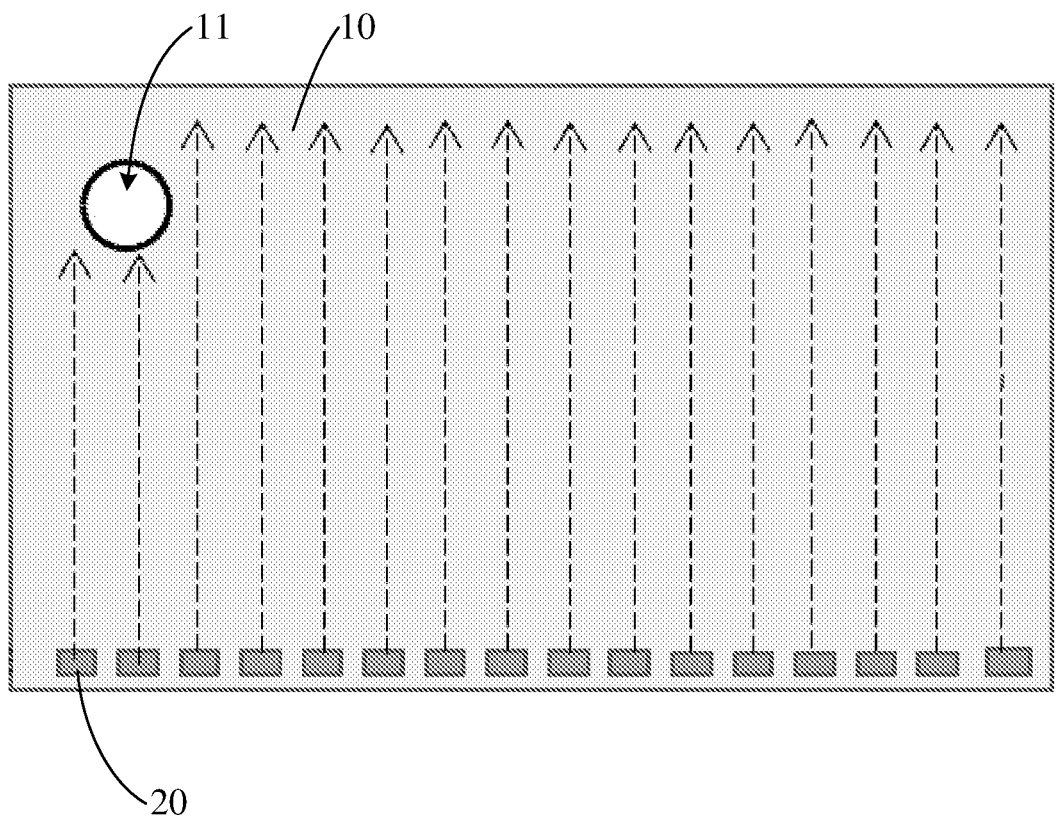
FIG. 1 is a schematic diagram of lights from a side light source according to a display panel in the prior art.

Referring to FIG. 1, FIG. 1 is a schematic diagram of lights from a side light source 20 according to a display panel 100 in the prior art. The display panel 100 includes a display screen 10 and a side light source 20. The display screen 10 is provided with a receiving hole 11, and the receiving hole 11 may be used to receive an under-screen electronic component, such as a camera module. The receiving hole 11 extends in a thickness direction of the display screen 10. The side light source 20 projects lights to the display screen 10 on a side in a length direction or a width direction of the display screen 10. The lights irradiated to the receiving hole 11 are reflected or blocked by the electronic components in the receiving hole 11, resulting in that the lights fail to reach a backlight side of the receiving hole 11. As such, an area of the display screen 10 located on a side of the receiving hole 11 away from the side light source 20 has a relatively low brightness. The overall display brightness of the display screen 10 is uneven, thereby affecting the display effect and display quality.

Figure 2:
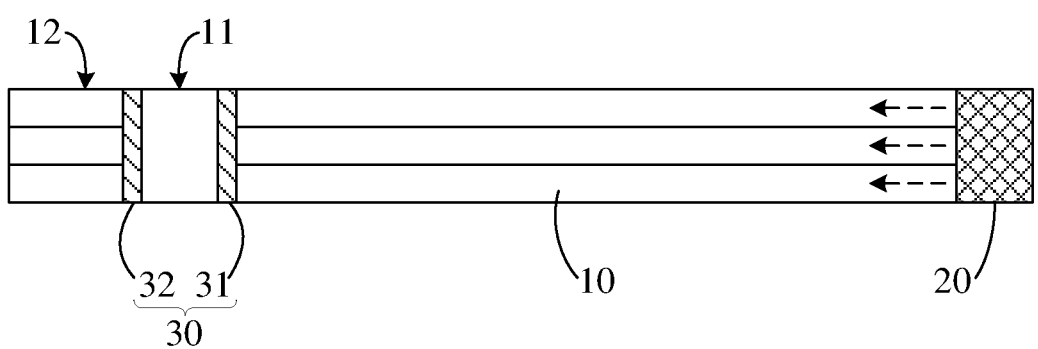
FIG. 2 is a schematic cross-sectional diagram of a display panel according to an embodiment of the present application.
Figure 3:
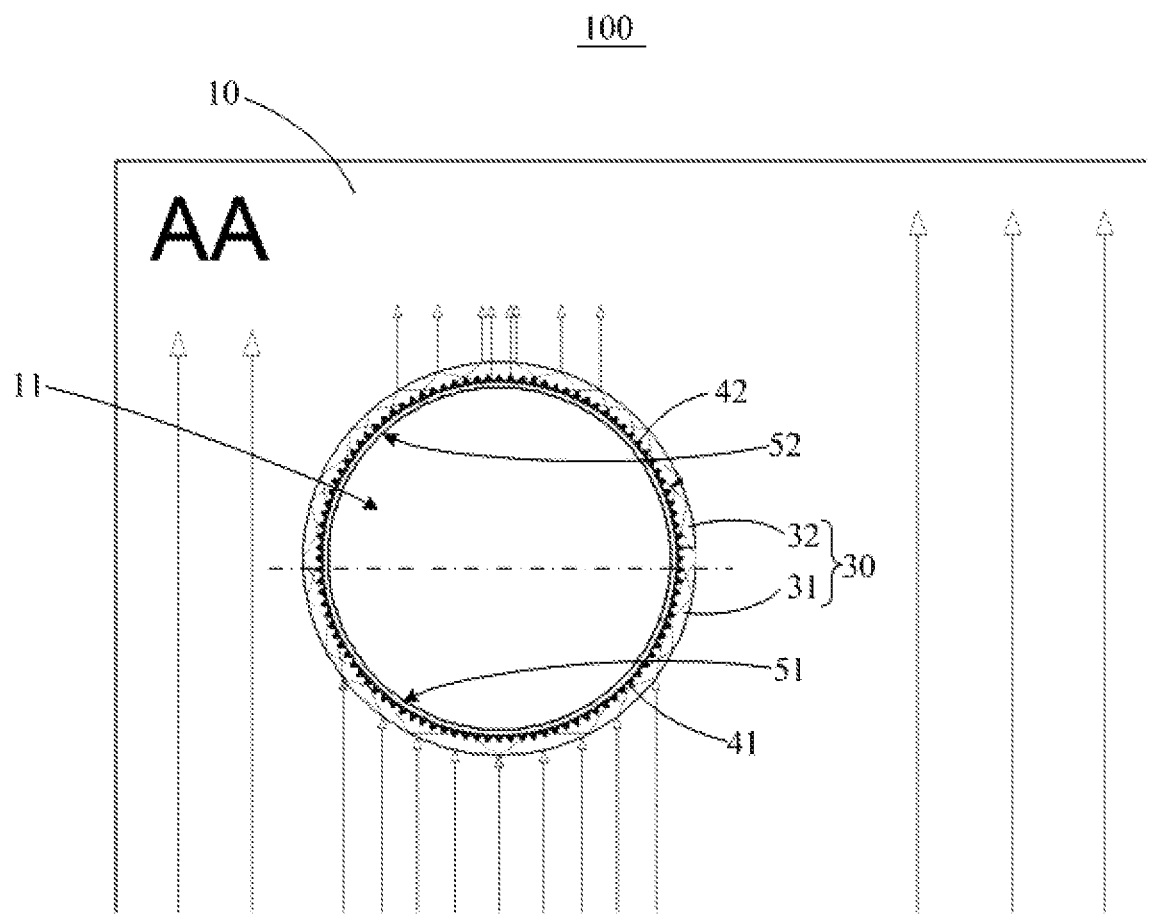
FIG. 3 is a schematic diagram of light irradiation of a display panel according to an embodiment of the present application.

In an embodiment, references are made to FIG. 2 and FIG. 3, wherein FIG. 2 is a schematic cross-sectional diagrams of a display panel 100 according to an embodiment of the present application, and FIG. 3 is a schematic diagram of light irradiation of a display panel 100 according to an embodiment of the present application. The display panel 100 provided by the embodiment of the present application includes a display screen 10, a side light source 20, and a frame 30. The display screen 10 has two main surfaces which are opposite to each other, and a side surface connected between the two main surfaces. The display screen 10 is provided with a receiving hole 11 axially perpendicular to the main surface. The side light source 20 is mounted on the side surface of the display screen 10. The frame 30 is disposed around the receiving hole 11. Further, the display screen 10 has a light-shielding region 12 where the lights from the side light source 20 is shielded by the frame 30. The frame 30 includes a light-facing portion 31 facing the side light source 20 and a backlight portion 32 away from the side light source 20. The backlight portion 32 faces the light-shielding region 12, and the backlight portion 32 is a light guide to guide the lights emitted from the side light source 20 to the light-shielding region 12.

Specifically, in this embodiment, the display screen 10 may be an OLED display screen 10 or an LCD display screen 10, which is not limited herein. When the display screen 10 is applied to different electronic devices, the shape and size of the display screen 10 are adaptively adjusted, and the shape and size of the display screen 10 are not specifically limited herein. For explanation, the following is an exemplary description in which the display screen 10 is rectangular. The display screen 10 generally includes an array substrate, a color film substrate, and a liquid crystal layer disposed between the array substrate and the color film substrate. The receiving hole 11 may be formed only on the array substrate, and then covered by the liquid crystal layer and the color film substrate. It may be formed on the array substrate and the liquid crystal layer, and then covered by the color film substrate. It should be understood that the array substrate may comprise multilayer stacked optical films stacked to convert the lights emitted by the side light source 20 into a more uniform area light source. The multilayer stacked optical films may include an emission sheet, a light guide sheet, a diffusion sheet, a light enhancement sheet, and the like, and is not specifically limited herein. The side light source 20 is specifically disposed on a side of the multilayer stacked optical films. The receiving hole 11 is provided through at least a front surface of the array substrate or the liquid crystal layer. For ease of mounting, the receiving hole 11 may be provided through the array substrate in the thickness direction. To reduce the effects of the receiving hole 11 on the overall appearance of the display screen 10, the receiving hole 11 is generally provided at a corner of the display screen 10, for example, at an upper left or right corner of the display screen 10 in an upright state. Generally, a cross-sectional shape of the receiving hole 11 is circular. In other embodiments, other cross-sectional shapes of the receiving hole 11 may be selected as desired, and are not particularly limited herein. It should be understood that an axial direction of the receiving hole 11 is perpendicular to the main surface, meaning that the axial direction of the receiving hole 11 is substantially perpendicular to the main surface. The axial direction of the receiving hole 11 may be at an included angle of 90 degrees with the main surface, and the included angle may have a deviation of not more than 5 degrees.

The side light source 20 may include a light emitting diode (LED), and the side light source 20 may also include an organic light emitting diode (OLED). The specific types of the side light source 20 is not limited herein. The side light source 20 provides the lights for the display screen 10. The side light source 20 is located on a length side or a width side of the display screen 10 (different from the thickness side), and the direction of the lights emitted from the side light source 20 is parallel to the length side or the width side of the display screen 10, for example, the lights emit along the length side of the display screen 10. With the position of the receiving hole 11 in the above, the side light source 20 may be disposed on a side of the display screen 10 away from the receiving hole, for example below the display screen 10 in an upright state, to reduce an area of the light-shielding region affected by shielding the side light source 20 by the receiving hole 11. That is, the side light source 20 is mounted at an end in the longitudinal side of the display screen 10, and the receiving hole 11 is located close to another end in the longitudinal side of the display screen 10. The fixing means of the side light source 20 and the display screen 10 may adopt the prior art, and details are not described herein.

The frame 30 is provided in a sleeve shape to surround the receiving hole 11. Then, in actual production, an inner diameter of the frame 30 is adapted to an outer diameter of the cross-sectional dimension of the electronic component (e.g., a camera) to be installed in the receiving hole 11. A radius of the receiving hole 11 is equal to a sum of a radius of an electronic component (e.g., a camera) to be installed in the receiving hole 11 and a thickness of the frame 30. During assembly, the frame 30 is embedded in the receiving hole 11, and then the electronic component is installed in the frame 30, so that the frame 30 can support and protect the electronic component. The frame 30 may be embedded in the receiving hole 11 by bonding, ultrasonic welding, interference fitting, or the like. That is, an outer peripheral wall of the frame 30 needs to be in close contact with an inner peripheral wall of the receiving hole 11 to ensure mounting stability. The frame 30 may be made of plastic cement, or may be made of plastic or other materials, not specifically limited herein. The frame 30 made of plastic cement provides cushioning protection for the electronic components. The thickness of the frame 30 in the circumferential direction may or may not be uniformly set, and may be selected and designed according to actual requirements. The specific thickness of the frame 30 may also be selected according to industry standards or actual requirements, and is not specifically limited herein.

It should be understood that the side light source 20 emits the lights toward the frame 30 such that the frame 30 includes a light-facing portion 31 facing the lights and a backlight portion 32 avoiding from the lights. It should be understood that a plane of a junction of the light-facing portion 31 and the backlight portion 32 is perpendicular to the side light source 20 and passes through a diameter of the frame 30. That is, a semi-cylindrical portion of the frame 30 facing the side light source 20 is the light-facing portion 31, and another semi-cylindrical portion of the frame 30 away from the side light source 20 is the backlight portion 32. The light-facing portion 31 and the backlight portion 32 are directly connected. The light-facing portion 31 and the backlight portion 32 may be made of same materials, or may be made of different materials, which is not limited herein. A thickness of the light-facing portion 31 is the same as or different from a thickness of the backlight portion 32. In order to ensure light transmission uniformity, it generally makes the thickness of the light-facing portion 31 uniform circumferentially, and makes the thickness of the backlight portion 32 uniform circumferentially.

When the side light source 20 emits the lights toward the frame 30, the lights are blocked by the frame 30, so that a light-shielding region 12 is provided in a region of the display screen 10 facing the backlight portion 32 of the frame 30 in a light-emitting direction of the side light source 20. In an actual use, an area of the light-shielding region 12 may slightly deviate, which is all within the range required by this embodiment. The backlight portion 32 is provided as a light guide. The light guide may be made of a light guide material, or may be made of an inner side wall of a light-transmitting material coated with a reflecting layer or a scattering layer, so that the lights around the backlight portion 32 can be guided to the light-shielding region 12. After the scattered lights around the backlight portion 32 are irradiated to the backlight portion 32, the lights are guided to the light-shielding region 12 under the action of the light guide. That is, the scattered lights are refracted toward the light-shielding region 12 to improve the brightness of the light-shielding region 12 effectively, thereby improving the overall brightness uniformity of the display screen 10, and improving the display effect.

In some embodiments, the display screen 10 has a first side surface and a second side surface opposite to each other. The side light source is mounted on the first side surface of the display screen 10, and the second side surface is provided with a scattering layer. The material of the scattering layer may include a metal material having a high reflectivity such as silver or aluminum. Specifically, the scattering material may be directly coated on the second side surface to form the scattering layer. It should be understood that the scattering layer can refract the lights emitted by the side light source at different angles rather than reflecting the light back along the original emitting path. By providing the scattering layer on the second side surface of the display screen 10, when the lights of the side light source 20 are irradiated to the second side surface, the lights may be refracted by the scattering layer. As such, the partially scattered lights can illuminate the light-shielding region 12; and the partially scattered lights can enter the backlight portion 32, and are guided to the light-shielding region 12 by the backlight portion 32. In this way, the brightness of the light-shielding region 12 can be improved, and the overall brightness uniformity of the display screen 10 can be improved, and the display effect can be improved. In addition, this structure has the advantages of ingenious design, low manufacturing cost, and easy manufacturing. When the display panel is mounted to the electronic device, the scattering layer may be provided at a position of a frame of the electronic device corresponding to the second side surface of the display screen 10.

According to the display panel of the present application, the side light source 20 is provided, and the frame 30 is provided in the receiving hole 11 of the display screen 10. As such, the backlight portion 32 of the frame 30 uses a light guide to guide the lights around the backlight portion 32 to the light-shielding region 12. In this way, the light guide can be used to guide the lights around the backlight portion 32 to the light-shielding region 12 while reducing the thickness of the display panel, and the brightness of the light-shielding region 12 of the display screen 10 can be improved, and the overall brightness of the display screen 10 can be more uniform. In addition, the frame 30 is fully utilized to improve the display effect, and no additional structure is required, which is simple in structure and low in manufacturing cost.

As shown in FIG. 3, both the light-facing portion 31 and the backlight portion 32 are light guides, and the lights emitted from the side light source 20 are irradiated to the light-facing portion 31 and guided to the backlight portion 32 in the circumferential direction of the frame 30.

In this embodiment, the light guides of the light-facing portion 31 and the backlight portion 32 may be made of a light guide material, or may be made of an inner side wall of a light-transmitting material coated with a reflecting layer or a scattering layer. The lights can be conducted in the circumferential direction of the frame 30. It should be understood that the materials of the light-facing portion 31 and the backlight portion 32 may be the same or different. The light-facing portion 31 and the backlight portion 32 may be integrally molded, or may be separately molded.

After the lights emitted from the side light source 20 are irradiated to the light-facing portion 31, the lights do not return back along the original emitting path, instead being refracted to the backlight portion 32 along the circumferential direction of the frame 30 under the action of the light guide material. The backlight portion 32 further guides the lights to the light-shielding region 12, so that the lights can be emitted to the region toward which the backlight portion 32 faces, that is, the light-shielding region 12, to further improve the brightness of this region. Thus, the overall brightness of the display screen 10 can be more uniform to improve the display effect. By providing both the light-facing portion 31 and the backlight portion 32 as light guides, that is, the overall frame 30 as light guides, the lights around the overall frame 30 can be utilized fully, especially the lights directly emitted from the side light source 20 toward the light-facing portion 31. Thus, the lights emitted from the backlight portion 32 toward the light-shielding region 12 are stronger, and the overall brightness uniformity of the display screen 10 are further improved.

The thickness of the light-facing portion 31 may be the same as or different from the thickness of the backlight portion 32. Alternatively, the thickness of the backlight portion 32 is larger than the thickness of the light-facing portion 31. In this way, according to the refraction principle of the lights, the lights entering the light-facing portion 31 substantially enter the backlight portion 32 along the circumferential direction of the frame 30, and are finally guided to the light-shielding region 12 by the backlight portion 32. When the thicknesses of the backlight portion 32 is the same as the thickness of the light-facing portion 31, the lights are more uniformly guided in the frame 30. In other embodiments, if the thickness of the backlight portion 32 is smaller than the thickness of the light-facing portion 31, the effect of the light transmission of the backlight portion 32 may be better. The relative thicknesses of the light-facing portion 31 and the backlight portion 32 may be selected according to actual requirements, and are not specifically limited herein.

Figure 4:
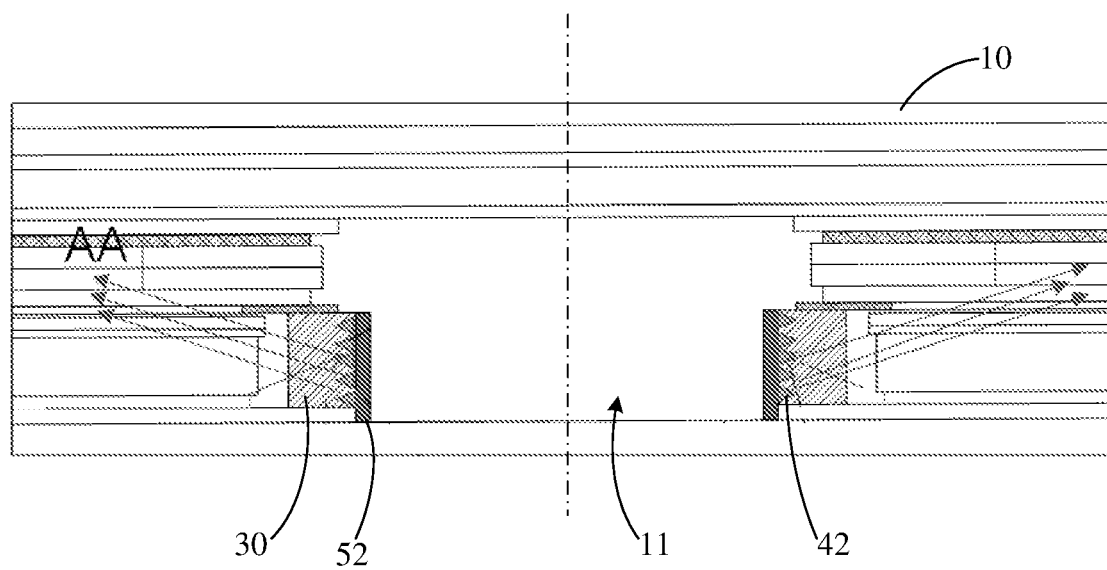
FIG. 4 is a schematic cross-sectional diagram of a display panel according to another embodiment of the present application.

While the light-facing portion 31 and the backlight portion 32 guide the lights along the circumferential direction of the frame 30, some of the lights directly passes through the light-facing portion 31 and the backlight portion 32 and enters the receiving hole 11, causing a loss of some of the lights. For this purpose, for example, references are made to FIG. 4, wherein FIG. 4 is a schematic cross-sectional diagram of a display panel according to another embodiment of the present application. The light-facing portion 31 includes a first reflecting layer 51 and a first light guide portion, wherein the first reflecting layer 51 is disposed on an inner peripheral surface of the first light guide portion. The backlight portion 32 includes a second reflecting layer 52 and a second light guide portion, wherein the second reflecting layer 52 is disposed on an inner peripheral surface of the second light guide portion.

The first reflecting layer 51 can prevent the lights from directly passing through the light-facing portion 31, instead that the first reflecting layer 51 can reflect the lights back to the light guide portion of the light-facing portion 31. As such, the light can be used more effectively and the effective utilization rate of the lights can be increased, and more lights can be allowed to be refracted to the backlight portion 32 through the light-facing portion 31. The first reflecting layer 51 and the second reflecting layer 52 may be provided with a coating of a reflective material, such as a white polyimide coating, to improve the reflective effect. While the polyimide coating also has insulating properties, thereby preventing electrostatic on the frame 30 to interfere the electronic components in the receiving hole 11.

The second reflecting layer 52 can reflect the lights refracted from the light-facing portion 31 and the scattered lights around to the light-shielding region 12 facing the display screen 10, to further improve the brightness uniformity of the display screen 10 and the effective utilization rate of the lights. At the same time, the first reflecting layer 51 and the second reflecting layer 52 can prevent the lights from passing through the light-facing portion 31 and the backlight portion 32 into the receiving hole 11. As such, when the image pickup devices or other photosensitive elements are provided in the frame 30, the interference of the lights from the display screen 10 to the image pickup devices or photosensitive elements in the frame 30 can be reduced.

During the process of the light being guided by the light guide to refract, a plurality of scattered light beams may be provided due to the difference in the refraction angle, thereby finally affecting the brightness effect of the light-shielding region 12. For this purpose, as shown in FIG. 3 and FIG. 4, the display panel 100 further includes a first condenser prism 41 disposed on a surface of the first reflecting layer 51 facing the first light guide portion, and a second condenser prism 42 disposed on a surface of the second reflecting layer 52 facing the second light guide portion.

The cross-sectional of the condenser prism has many shapes, and it is only necessary to be able to reflect the lights after the lights entering the frame 30 are condensed, which is not specifically limited herein.

The first condenser prism 41 can reduce the amount of the lights lost by scattering during the refraction of the lights by the first light guide portion, thereby ensuring the intensity of the lights irradiated to the backlight portion 32. The second condenser prism 42 on the backlight portion 32 can further converge the irradiated lights to further improve the brightness of a region toward which the backlight portion 32 faces. In a practical application, both the light-facing portion 31 and the backlight portion 32 may be made of the light guide material. In this way, after the lights are guided by the light-facing portion 31 to the backlight portion 32, these lights may continue to be guided by the backlight portion 32 to a position farther away from the light-facing portion 31, that is, a position closer to a region toward which the lights are directed. In this way, the lights may be more intensively irradiated to the light-shielding region 12 to further improve the brightness of this region.

The second condenser prism 42 is disposed at least at a position of the backlight portion 32 close to the light-facing portion 31. After the lights are guided by the light-facing portion 31 and irradiated to the backlight portion 32, the lights converge under the action of the second condenser prism 42, so that the effective intensity of the lights in the backlight portion 32 can be increased to reduce the loss of the lights in the refraction process. Specifically, the number of the first condenser prisms 41 is plural, and a plurality of the first condenser prisms 41 are arranged along the circumferential direction of the first reflecting layer 51. The number of the second condenser prisms 42 is plural, and a plurality of the second condenser prisms 42 are arranged along the circumferential direction of the second reflecting layer 52. In this way, it is possible to improve the focusing effect of the whole backlight portion 32 on the ambient lights, so that the backlight portion 32 can reflect the lights with greater intensity. The condenser prism may be embedded inside the frame 30, or may be disposed outside the frame 30. Specifically, the condenser prism is attached on an inner wall surface or an outer wall surface of the frame 30. When the condenser prism is attached to the inner wall surface of the frame 30, combined with an embodiment in which the light-facing portion 31 and the backlight portion 32 is disposed on the reflecting layer, the condenser prism is provided at the periphery of the reflecting layer. In this way, the lights reflected by the reflecting layer are converged by the condenser prism and then emitted, thereby effectively improving the brightness of the light-shielding region 12 and ensuring the brightness uniformity of the display screen 10.

In order to further enhance the light converging effect, optionally, a plurality of the light condenser prisms are fixed to the inner peripheral wall of the frame 30 along the circumferential direction of the frame 30. In this way, if the whole inner peripheral wall of the frame 30 is covered by the condenser prism, the frame 30 can be made to use the condenser prism in a maximum area, so that the light collecting effect of the entire display panel is maximized. Further, the brightness of the lights irradiated by the backlight portion 32 to the light-shielding region 12 can coincide with the lights irradiated to other regions of the display screen 10, and the brightness uniformity of the whole display panel is optimized.

Specifically, the condenser prism is wrapped inside the backlight portion 32 and the light-facing portion 31. The condenser prism is attached on the inner wall surface of the backlight portion 32 and the light-facing portion 31, and the height of the condenser prism in the radial direction of the frame 30 is smaller than the thickness of the backlight portion 32 and the thickness of the light-facing portion 31. In this way, the backlight portion 32 and the light-facing portion 31 can guide the lights while converging the lights through a plurality of condenser prisms, thereby preventing the condenser prism from being beyond the frame 30 and causing the loss of the lights. In this way, the light guiding and converging effect of the whole frame 30 with the condenser prism is better, the light utilization rate is improved, and the intensity of the lights emitted from the backlight portion 32 to the light-shielding region 12 is further improved, thereby effectively increasing the brightness of the light-shielding region 12 and ensuring the brightness uniformity of the whole display panel.

The second condenser prism 42 on the backlight portion 32 and the first condenser prism 41 on the light-facing portion 31 may have the same or different densities. In some embodiments, the density of the second condenser prisms 42 disposed on the backlight portion 32 is greater than the density of the first condenser prisms 41 disposed on the light-facing portion 31. It should be understood that since the backlight portion 32 is disposed directly toward the light-shielding region 12 in the light-emitting direction of the side light source 20, it is necessary to make the backlight portion 32 have a larger light intensity than the light-facing portion 31. Therefore, by making the density of the second condenser prisms 42 disposed on the backlight portion 32 larger than the density of the first condenser prisms 41 disposed on the light-facing portion 31, the backlight portion 32 can not only converge more scattered light around it, but also can better converge the lights guided to the backlight portion 32 by the light-facing portion 31. As such, the lights at the backlight portion 32 pass through the second condenser prism 42 and converge more and more, and the intensity of the lights emitted from the backlight portion 32 toward the light-shielding region 12 is higher, thereby effectively satisfying the need for brightness improvement of the light-shielding region 12. Specifically, the density of the condenser prisms provided at the backlight portion 32 and the light-facing portion 31 may be adjusted by adjusting the size or number of the condenser prisms.

Not only the lights at the backlight portion 32 can be made stronger by providing the density of the condenser prisms at the backlight portion 32 and the light-facing portion 31, but also the light-converging effect at the backlight portion 32 and the light-facing portion 31 is changed by providing different light-converging angles with the second condenser prism 42 of the backlight portion 32 and the first condenser prism 41 of the light-facing portion 31. In some embodiments, the density of the condenser prisms provided at the backlight portion 32 and the light-facing portion 31 and the light-converging angles of the condenser prisms at the backlight portion 32 and the light-facing portion 31 may also be adjusted at the same time, so that the intensity of the lights emitted toward the light-shielding region 12 at the backlight portion 32 is optimized.

The light-facing portion 31 and the backlight portion 32 may be separately produced and then spliced, or may be directly integrally molded. If the materials of the light-facing portion 31 and the backlight portion 32 are different, a double-material molding process may be used. If the materials of the light-facing portion 31 and the backlight portion 32 are the same, a single-material may be directly injected. The integrally molding can improve the continuity of the light-facing portion 31 and the backlight portion 32 at the junction, thereby reducing the loss of the lights as it passes through the junction, and further ensuring the intensity of the lights reaching the backlight portion 32.

The shape of the receiving hole 11 may be circular or elliptical, or may be other shapes such as semicircle. Exemplarily, as shown in FIG. 2, the receiving hole 11 is provided as a circular hole or an elliptical hole, and the shape of the frame 30 corresponds to the shape of the receiving hole 11. If the shape of the receiving hole 11 is circular or elliptical, the frame 30 is cylindrical or elliptical cylindrical. The surface of the cylindrical or elliptical cylindrical frame 30 is a continuous convex arc surface, and the continuous convex arc surface can reduce the abrupt change of the light-refracting path, so that the lights are more stably refracted from the light-facing portion 31 to the backlight portion 32, thereby further reducing the loss of the lights during refraction.

In some embodiments, the display panel further includes an enclosure that encloses a periphery of the display screen 10. The enclosure may in particular comprise a rubber frame, and a metal frame fixed and surrounding the periphery of the rubber frame. The rubber frame is brought into contact with the display screen 10 to provide a cushion. By wrapping the rubber frame with the metal frame, the display screen can be effectively protected from damage caused by external force impact.

An embodiment of the present application further provides a display device including a control panel, a camera unit, and a display panel 100 as described above. The camera unit is mounted in a receiving hole 11 of the display panel 100, the control panel is electrically connected to the display panel 100 and the camera unit. Specifically, when the frame 30 is embedded in the receiving hole 11, the camera unit is fixedly installed in an inner cavity of the frame 30. The camera unit and the frame 30 may be fixedly connected by glue bonding, welding, or the like, which is not specifically limited herein. The camera unit may be specifically a front-facing camera for capturing an image near a side of the display panel. The display device may be an electronic reader, a mobile phone, a tablet computer, a television, a display, a notebook computer, a digital photo frame, a navigator, an on-board display device, or any product or component having a display function.

In the display panel according to the embodiment of the present application, the side light source 20 is used, and the frame 30 is provided in the receiving hole 11 of the display screen 10, so that the backlight portion 32 of the frame 30 uses the light guide. When the scattered lights around the backlight portion 32 are irradiated to the backlight portion 32, the light guide guides the lights around the backlight portion 32 to the light-shielding region 12. In this way, the light guide can be used to guide the lights to the light-shielding region 12 while reducing the thickness of the display panel, so that the brightness of the light-shielding region 12 of the display screen 10 can be improved, and the overall brightness of the display screen 10 can be more uniform. In addition, the frame 30 is fully utilized to improve the display effect, and no additional structure is required, while the display panel is simple in structure and low in manufacturing cost. By using the display panel of the present application, the overall thickness of the display device is thinner, and the cost is lower while ensuring uniform brightness of the whole display screen. That is, the display device has a high overall performance cost, and the user experience can be greatly improved, thereby further improving the market competitiveness of the product.

In the above-described embodiments, the description of each of the embodiments is focused, and for a part not described in detail in some embodiments, reference may be made to the related description of other embodiments.

The terms "first" and "second" used in this application are merely for description, rather than indicating or implying the relatively importance or the number of the referred features implicitly. Thus, the features defined with "first" and "second" may include one or more features explicitly or implicitly.

The display panel provided in the embodiments of the present application is described in detail above. The principles and implementation of the present application are described herein by applying specific examples. The description of the above embodiments is only used to help understand the method and core idea of the present application. Meanwhile, for those skilled in the art, according to the idea of the present application, there will be some changes in specific embodiments and application scope. In conclusion, the contents of the present specification shall not be construed as limiting the present application.

What is claimed is:

1. A display panel, comprising:
   a display screen, wherein the display screen has two main surfaces opposite to each other and a side surface connected between the two main surfaces, the display screen is provided with a receiving hole, and the receiving hole is perpendicular to the main surface axially;
   a side light source mounted on a side surface of the display screen; and
   a frame disposed around the receiving hole, and an outer peripheral wall of the frame being in direct contact with an inner peripheral wall of the receiving hole;
   wherein the display screen has a light-shielding region in which the side light source is shielded by the frame, the frame includes a light-facing portion facing the side light source and a backlight portion facing the light-shielding region, and the backlight portion is provided as a light guide to guide the lights emitted from the side light source toward the frame to the light-shielding region.

2. The display panel of claim 1, wherein the light-facing portion and the backlight portion are light guides, and lights emitted from the side light source are irradiated to the light-facing portion and are guided to the backlight portion along a circumferential direction of the frame.

3. The display panel of claim 1, wherein the light-facing portion comprises a first reflecting layer and a first light guide portion, the first reflecting layer is disposed on an inner peripheral surface of the first light guide portion, the backlight portion comprises a second reflecting layer and a second light guide portion, and the second reflecting layer is disposed on an inner peripheral surface of the second light guide portion.

4. The display panel of claim 3, wherein the first reflecting layer and the second reflecting layer are white polyimide coatings.

5. The display panel of claim 3, wherein the display panel further comprises a first condenser prism disposed on a surface of the first reflecting layer facing the first light guide portion and a second condenser prism disposed on a surface of the second reflecting layer facing the second light guide portion.

6. The display panel of claim 5, wherein a number of the first condenser prisms is plural, and a plurality of the first condenser prisms are arranged along a circumferential direction of the first reflecting layer, a number of the second condenser prisms is plural, and a plurality of the second condenser prisms are arranged along a circumferential direction of the second reflecting layer.

7. The display panel of claim 1, wherein the side light source is mounted at an end of a longitudinal side of the display screen, and the receiving hole is close to another end of the longitudinal side of the display screen.

8. The display panel of claim 1, wherein the light-facing portion is integrally molded with the backlight portion.

9. The display panel of claim 1, wherein the receiving hole is provided as a circular hole or an elliptical hole, and the frame has a shape corresponding to the receiving hole.

10. A display device, comprising a control panel, a camera unit, and a display panel, wherein the camera unit is mounted in a receiving hole of the display panel, and the control panel is electrically connected to the display panel and the camera unit;
    wherein the display panel, comprising:
    a display screen, wherein the display screen has two main surfaces opposite to each other and a side surface connected between the two main surfaces, the display screen is provided with a receiving hole, and the receiving hole is perpendicular to the main surface axially;
    a side light source mounted on a side surface of the display screen; and
    a frame disposed around the receiving hole, and an outer peripheral wall of the frame being in direct contact with an inner peripheral wall of the receiving hole;
    wherein the display screen has a light-shielding region in which the side light source is shielded by the frame, the frame includes a light-facing portion facing the side light source and a backlight portion facing the light-shielding region, and the backlight portion is provided as a light guide to guide the lights emitted from the side light source toward the frame to the light-shielding region.

11. The display device of claim 10, wherein the light-facing portion and the backlight portion are light guides, and lights emitted from the side light source are irradiated to the light-facing portion and are guided to the backlight portion along a circumferential direction of the frame.

12. The display device of claim 10, wherein the light-facing portion comprises a first reflecting layer and a first light guide portion, the first reflecting layer is disposed on an inner peripheral surface of the first light guide portion, the backlight portion comprises a second reflecting layer and a second light guide portion, and the second reflecting layer is disposed on an inner peripheral surface of the second light guide portion.

13. The display device of claim 12, wherein the first reflecting layer and the second reflecting layer are white polyimide coatings.

14. The display device of claim 12, wherein the display panel further comprises a first condenser prism disposed on a surface of the first reflecting layer facing the first light guide portion and a second condenser prism disposed on a surface of the second reflecting layer facing the second light guide portion.

15. The display device of claim 14, wherein a number of the first condenser prisms is plural, and a plurality of the first condenser prisms are arranged along a circumferential direction of the first reflecting layer, a number of the second condenser prisms is plural, and a plurality of the second condenser prisms are arranged along a circumferential direction of the second reflecting layer.

16. The display device of claim 10, wherein the side light source is mounted at an end of a longitudinal side of the display screen, and the receiving hole is close to another end of the longitudinal side of the display screen.

17. The display device of claim 10, wherein the light-facing portion is integrally molded with the backlight portion.

18. The display device of claim 10, wherein the receiving hole is provided as a circular hole or an elliptical hole, and the frame has a shape corresponding to the receiving hole.

19. The display device of claim 10, wherein an inner diameter of the frame is adapted to an outer diameter of a cross-sectional dimension of the camera unit mounted in the receiving hole.

20. The display device of claim 10, wherein a radius of the receiving hole is equal to a sum of a radius of the camera unit and a thickness of the frame.

* * * * *